(12) United States Patent
Fujii (10) Patent No.: US 10,584,667 B2
(45) Date of Patent: Mar. 10, 2020

(54) ONE-WAY VALVE AND FUEL SEPARATING APPARATUS INCLUDING THE SAME

(71) Applicant: HONDA MOTOR CO., LTD., Tokyo (JP)

(72) Inventor: Noriaki Fujii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 512 days.

(21) Appl. No.: 15/343,210

(22) Filed: Nov. 4, 2016

(65) Prior Publication Data

US 2017/0122274 A1 May 4, 2017

(30) Foreign Application Priority Data

Nov. 4, 2015 (JP) .................................. 2015-216692

(51) Int. Cl.
*F02M 37/22* (2019.01)
*B01D 61/36* (2006.01)
*F16K 15/02* (2006.01)
*F16K 27/02* (2006.01)

(52) U.S. Cl.
CPC ........... *F02M 37/22* (2013.01); *B01D 61/366* (2013.01); *F16K 15/026* (2013.01); *F16K 27/0209* (2013.01); *B01D 2313/18* (2013.01); *B01D 2313/243* (2013.01); *B01D 2313/38* (2013.01)

(58) Field of Classification Search
CPC .......... B01D 2313/18; B01D 2313/243; B01D 2313/38; B01D 61/366; F02M 37/22; F16K 15/025; F16K 15/026; F16K 27/0209
See application file for complete search history.

(56) References Cited

U.S. PATENT DOCUMENTS

| | | | | | |
|---|---|---|---|---|---|
| 2,960,998 | A | * | 11/1960 | Sinker | ........................ F16K 1/46 |
| | | | | | 137/542 |
| 5,996,619 | A | * | 12/1999 | Saur | ........................... F01P 7/14 |
| | | | | | 137/543.23 |
| 2017/0122275 | A1 | * | 5/2017 | Ishimitsu | ............ F02M 37/0011 |

FOREIGN PATENT DOCUMENTS

| | | | | | |
|---|---|---|---|---|---|
| GB | | 462799 A | * | 3/1937 | ............ F16K 15/20 |
| JP | | 2011-208541 | | 10/2011 | |
| WO | WO-2015155813 A1 | * | 10/2015 | ......... F02M 37/0011 |

* cited by examiner

*Primary Examiner* — Terry K Cecil
(74) *Attorney, Agent, or Firm* — Mori & Ward, LLP (57) ABSTRACT

A one-way valve includes a housing with a center axis. The housing includes a peripheral side wall around the center axis, and an inward flange protruding from the peripheral side wall toward the center axis. A valve member is inserted into the housing and includes an outer peripheral surface around the center axis, and an outward flange protruding from the outer peripheral surface toward the peripheral side wall. A coil spring includes a first axial end having a first diameter and being in contact with the inward flange and the peripheral side wall, a second axial end having a second diameter smaller than a first diameter, the second axial end being in contact with the outward flange and the outer peripheral surface, and a body portion provided between the first axial end and the second axial end and having diameters decreasing from the first diameter to the second diameter.

23 Claims, 4 Drawing Sheets

FIG. 5

ONE-WAY VALVE AND FUEL SEPARATING APPARATUS INCLUDING THE SAME

CROSS-REFERENCE TO RELATED APPLICATIONS

The present application claims priority under 35 U.S.C. § 119 to Japanese Patent Application No. 2015-216692, filed Nov. 4, 2015, entitled "One-Way Valve and Fuel Separating Apparatus Including the Same." The contents of this application are incorporated herein by reference in their entirety.

BACKGROUND

1. Field

The present disclosure relates to a one-way valve and a fuel separating apparatus including the one-way valve.

2. Description of the Related Art

There is known a fuel supply apparatus that separates raw fuel containing components having different octane numbers, such as ethanol-containing gasoline, by a separator into a high-octane fuel containing more high-octane components than the raw fuel and a low-octane fuel containing more low-octane components than the raw fuel and that selectively supplies the high-octane fuel and the low-octane fuel to an internal combustion engine (see, for example, Japanese Unexamined Patent Application Publication No. 2011-208541). This fuel supply apparatus includes a raw-fuel tank that stores raw fuel, a heater that heats the raw fuel, a separator that separates the heated raw fuel into a high-octane fuel and a low-octane fuel, a cooler that cools the separated fuels, and a high-octane-fuel tank that stores the high-octane fuel.

SUMMARY

According to one aspect of the present invention, a one-way valve includes a cylindrical housing having an inward flange, a shaft-shaped valve member stored in the housing to be movable in an axial direction of the housing and having an outward flange, and a coil spring provided between the inward flange and the outward flange to surround at least a part of the valve member. The coil spring includes a large-diameter portion provided at one axial end to be in contact with an outer edge portion of the inward flange and an inner peripheral surface of the housing, a small-diameter portion provided at the other axial end to be in contact with an inner edge portion of the outward flange and an outer peripheral surface of the valve member, and a body portion provided in an axial intermediate portion and having a diameter larger than a diameter of the small-diameter portion and smaller than a diameter of the large-diameter portion.

According to another aspect of the present invention, a one-way valve includes a housing, a valve member, and a coil spring. The housing has a substantially cylindrical shape with a center axis. The housing includes a peripheral side wall and an inward flange. The peripheral side wall is provided around the center axis. The inward flange protrudes from the peripheral side wall toward the center axis. The valve member is inserted into the housing to be movable along the center axis. The valve member includes an outer peripheral surface and an outward flange. The outer peripheral surface is provided around the center axis. The outer peripheral surface faces the inward flange in a radial direction perpendicular to the center axis. The outward flange protrudes from the outer peripheral surface toward the peripheral side wall. The coil spring is provided between the inward flange and the outward flange along the center axis to surround the valve member. The coil spring a first axial end, a second axial end, and a body portion. The first axial end has a first diameter and is in contact with the inward flange and the peripheral side wall. The second axial end has a second diameter smaller than a first diameter. The second axial end is opposite to the first axial end along the center axis and is in contact with the outward flange and the outer peripheral surface. The body portion is provided between the first axial end and the second axial end along the center axis and has diameters decreasing from the first diameter to the second diameter.

According to further aspect of the present invention, a one-way valve includes a housing, a valve member, and a coil spring. The housing has a substantially cylindrical shape with a center axis. The housing includes a peripheral side wall, an annular projecting portion, and a coil spring support portion. The peripheral side wall is provided around the center axis. The annular projecting portion protrudes from the peripheral side wall toward the center axis. The coil spring support portion protrudes from the peripheral side wall toward the center axis. The valve member is inserted into the housing to be movable along the center axis. The valve member includes an outer peripheral surface and an outward flange. The outer peripheral surface is provided around the center axis. The outer peripheral surface faces the annular projecting portion in a radial direction perpendicular to the center axis. The outward flange is provided between the annular projecting portion and the coil spring support portion along the center axis and protrudes from the outer peripheral surface toward the peripheral side wall. The coil spring is provided between the coil spring support portion and the outward flange along the center axis. The coil spring a first axial end, a second axial end, and a body portion. The first axial end has a first diameter and is in contact with the coil spring support portion and the peripheral side wall. The second axial end has a second diameter smaller than a first diameter. The second axial end is opposite to the first axial end along the center axis and is in contact with the outward flange and the outer peripheral surface. The body portion is provided between the first axial end and the second axial end along the center axis and has diameters decreasing from the first diameter to the second diameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Embodiments of a fuel separating apparatus and a one-way valve used in the fuel separating apparatus according to the present disclosure will be described with reference to the drawings. A fuel separating apparatus according to each embodiment is installed in an automobile and supplies fuel to an internal combustion engine similarly installed in the automobile.

First Embodiment

Figure 1:
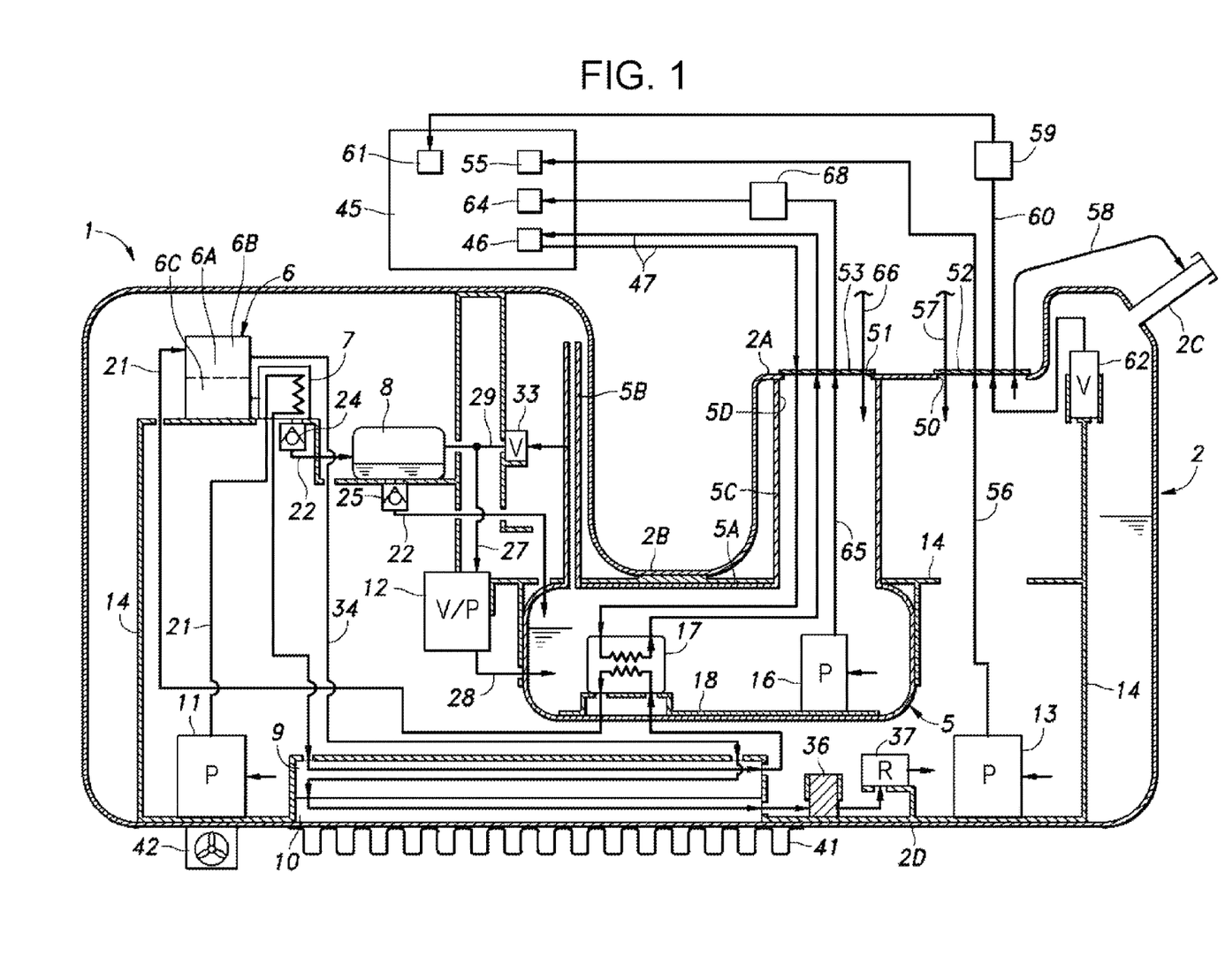
FIG. 1 is a cross-sectional view of a fuel separating apparatus according to a first embodiment.

First, a first embodiment will be described with reference to FIGS. 1 and 2. As illustrated in FIG. 1, a fuel separating apparatus 1 of the first embodiment includes a raw-fuel tank 2 that stores raw fuel. The raw fuel is a fuel containing components having different octane numbers. For example, the raw fuel is a mixed fuel in which alcohol, such as ethanol, is mixed in gasoline (ethanol-containing gasoline).

The shape of the raw-fuel tank 2 can be appropriately set. In the first embodiment, the raw-fuel tank 2 has a flat shape extending in the horizontal direction. A recess 2B depressed downward is provided in the widthwise center of an upper wall portion 2A of the raw-fuel tank 2. In a state in which the raw-fuel tank 2 is installed in the automobile, the recess 2B is disposed in the widthwise center, and a component of the automobile, such as a propeller shaft, is disposed inside the recess 2B. The upper wall portion 2A of the raw-fuel tank 2 is provided with a fuel filler pipe 2C, and raw fuel can be supplied from the outside through the fuel filler pipe 2C.

Inside the raw-fuel tank 2, there are provided a high-octane-fuel tank 5, a separator 6, a condenser 7, a buffer tank 8, a first heat exchanger 9, a second heat exchanger 10, a fuel circulating pump 11, a vacuum pump 12, a raw-fuel pump 13, and a first carrier 14 serving as a frame member that supports these elements. Inside the high-octane-fuel tank 5, there are provided a high-octane-fuel pump 16, a third heat exchanger 17, and a second carrier 18 serving as a frame member that supports these elements.

The fuel circulating pump 11 is provided at the bottom of the raw-fuel tank 2 to pressurize and feed raw fuel stored in the raw-fuel tank 2 toward the separator 6. On a route of a conduit 21 connected to the fuel circulating pump 11 and the separator 6, the condenser 7, the first heat exchanger 9, and the third heat exchanger 17 are arranged in order from the side of the fuel circulating pump 11. The raw fuel pressure-fed from the fuel circulating pump 11 exchanges heat in the condenser 7, the first heat exchanger 9, and the third heat exchanger 17, and is then supplied to the separator 6 at a temperature higher than that of the raw fuel stored at the bottom of the raw-fuel tank 2. Details of the condenser 7, the first heat exchanger 9, and the third heat exchanger 17 will be described later.

The separator 6 separates the raw fuel into a high-octane fuel containing more high-octane components than the raw fuel and a low-octane fuel containing more low-octane components than the raw fuel by pervaporation (PV). The separator 6 includes a separation film 6A that selectively allows permeation of the high-octane components in the raw fuel and first and second chambers 6B and 6C defined by the separation film 6A. For example, the separation film 6A is a polymer film having no pore or an inorganic film having micropores of a molecular level, and is appropriately selected according to the components to be separated from the raw fuel. For example, when the raw fuel is ethanol-containing gasoline, the selected separation film 6A preferably selectively allows ethanol and an aromatic substance to permeate therethrough.

High-temperature and high-pressure raw fuel is supplied by the fuel circulating pump 11 to the first chamber 6B of the separator 6 after passing through the condenser 7, the first heat exchanger 9, and the third heat exchanger 17. The second chamber 6C is depressurized by a vacuum pump 12 to be described later. Thus, high-octane components in the raw fuel supplied to the first chamber 6B pass in a gaseous state through the separation film 6A, and are collected into the second chamber 6C. For this reason, the fuel in the second chamber 6C is a high-octane fuel containing more high-octane components than the raw fuel. On the other hand, high-octane components are separated from the raw fuel supplied to the first chamber 6B as the raw fuel flows toward an exit of the first chamber 6B, and a low-octane fuel containing more low-octane components than the raw fuel is obtained. When the raw fuel is ethanol-containing gasoline, the high-octane fuel collected in the second chamber 6C mainly contains ethanol, and the low-octane fuel passing through the first chamber 6B contains gasoline whose ethanol content (concentration) is reduced.

The condenser 7 is preferably adjacent to the second chamber 6C of the separator 6. In the first embodiment, the condenser 7 is adjacent to the right side of the second chamber 6C of the separator 6. In the condenser 7, the high-octane fuel in a gaseous state supplied from the second chamber 6C and the raw fuel supplied from the fuel circulating pump 11 exchange heat therebetween in an unmixed state. By this heat exchange, the high-octane fuel in the gaseous state is cooled and condensed, and the raw fuel is heated.

The condenser 7 is connected to the high-octane-fuel tank 5 by a conduit 22. On a route of the conduit 22, the buffer tank 8 is provided. The condenser 7 is disposed at a position higher than the buffer tank 8 and the high-octane-fuel tank 5, and the buffer tank 8 is disposed at a position higher than the high-octane-fuel tank 5. In detail, the positional relationship among the condenser 7, the buffer tank 8, and the high-octane-fuel tank 5 is set so that the liquid level in the condenser 7 is higher than the liquid level in the buffer tank 8 and the liquid level in the high-octane-fuel tank 5 and the liquid level in the buffer tank 8 is higher than the liquid level in the high-octane-fuel tank 5. Further, the separator 6 is preferably disposed at a position higher than the buffer tank 8 and the high-octane-fuel tank 5. Owing to the positional relationship among the condenser 7, the buffer tank 8, and the high-octane-fuel tank 5, the high-octane fuel that becomes liquid in the condenser 7 flows to the buffer tank 8 by gravity, and further flows from the buffer tank 8 to the high-octane-fuel tank 5.

In a portion of the conduit 22 that connects the condenser 7 and the buffer tank 8, a first one-way valve 24 is provided to permit only the flow of fluid from the condenser 7 toward the buffer tank 8. In a portion of the conduit 22 that connects the buffer tank 8 and the high-octane-fuel tank 5, a second one-way valve 25 is provided to permit only the flow of fluid from the buffer tank 8 toward the high-octane-fuel tank 5.

An intake port of the vacuum pump 12 is connected to a gaseous phase part in an upper portion of the buffer tank 8 by a conduit 27. An exhaust port of the vacuum pump 12 is connected to a lower portion of the high-octane-fuel tank 5 by a conduit 28. When the vacuum pump 12 is driven, the gas in the upper portion of the buffer tank 8 is transported to the high-octane-fuel tank 5 through the conduits 27 and 28, and the buffer tank 8 is thereby depressurized. Depressurization of the buffer tank 8 accelerates the flow of fluid from the condenser 7 toward the buffer tank 8, the first one-way valve 24 is opened, and the condenser 7 and the second chamber 6C of the separator 6 communicating with the buffer tank 8 are depressurized. At this time, the second one-way valve 25 is closed by depressurization of the buffer tank 8, and the high-octane-fuel tank 5 is not depressurized.

The conduit 27 that allows communication between the vacuum pump 12 and the buffer tank 8 has a branch pipe 29. A distal end portion of the branch pipe 29 communicates with a gaseous phase part of the raw-fuel tank 2. In the first embodiment, an upper wall portion 5A of the high-octane-fuel tank 5 is provided with a communication pipe 5B that allows communication between the gaseous phase part in the inner upper portion of the high-octane-fuel tank 5 and the gaseous phase part in the upper part of the raw-fuel tank 2. The branch pipe 29 is connected to the communication pipe 5B, and communicates with the gaseous phase part of the raw-fuel tank 2 via the communication pipe 5B. The communication pipe 5B has one end disposed close to an inner surface of the upper wall portion 2A of the raw-fuel tank 2 and the other end disposed close to an inner surface of the upper wall portion 5A of the high-octane-fuel tank 5.

On a route of the branch pipe 29, an opening/closing valve 33 formed by an electromagnetic valve is provided. The opening/closing valve 33 is closed when the buffer tank 8 is depressurized. When the opening/closing valve 33 is opened, the gas in the raw-fuel tank 2 flows into the buffer tank 8 via the communication pipe 5B, the branch pipe 29, and the conduit 27, and the pressure in the buffer tank 8 becomes equal to the pressure in the raw-fuel tank 2. When the high-octane fuel in a liquid state in the buffer tank 8 is transported to the high-octane-fuel tank 5, the vacuum pump 12 is stopped, and the opening/closing valve 33 is opened. Thus, the buffer tank 8 is released from depressurization, the high-octane fuel flows from the buffer tank 8 toward the high-octane-fuel tank 5 by gravity, and the second one-way valve 25 is opened.

The exit of the first chamber 6B of the separator 6 communicates with a lower space inside the raw-fuel tank 2 via a conduit 34. On a route of the conduit 34, the first heat exchanger 9, the second heat exchanger 10, a strainer 36, and a pressure control valve 37 are arranged in order from the side of the separator 6.

The first heat exchanger 9 exchanges heat between the raw fuel having a relatively low temperature to be supplied from the fuel circulating pump 11 to the separator 6 and the low-octane fuel having a relatively high temperature and passed through the separator 6 in an unmixed state. The first heat exchanger 9 may be a known counterflow heat exchanger. By heat exchange in the first heat exchanger 9, the raw fuel supplied from the fuel circulating pump 11 to the separator 6 is heated, and the low-octane fuel passing through the separator 6 is cooled.

The second heat exchanger 10 has an internal space through which the low-octane fuel having a relatively high temperature and passing through the separator 6 passes, and an outer surface in contact with the inner surface of the wall portion of the raw-fuel tank 2, and exchanges heat between the low-octane fuel and the wall portion of the raw-fuel tank 2. In the first embodiment, the second heat exchanger 10 is shaped like a flat sheet, and is disposed in contact with an inner surface of a bottom wall portion 2D of the raw-fuel tank 2. The second heat exchanger 10 extends over a wide range of the inner surface of the bottom wall portion 2D to ensure a wide contact area with the bottom wall portion 2D.

A plurality of fins 41 are provided on an outer surface of the bottom wall portion 2D of the raw-fuel tank 2. The fins 41 expands the outer surface of the bottom wall portion 2D to accelerate heat radiation from the bottom wall portion 2D due to air cooling. For example, the fins 41 may be formed by a corrugated fin having a pleated shape (wavy shape). Cooling of the bottom wall portion 2D of the raw-fuel tank 2 is accelerated by traveling air of the automobile in which the fuel separating apparatus 1 is installed.

A fan 42 is provided on the outer surface of the bottom wall portion 2D of the raw-fuel tank 2. The fan 42 supplies air toward the outer surface of the bottom wall portion 2D to forcibly cool the bottom wall portion 2D. In other embodiments, the fan 42 may be supported by the vehicle body frame of the automobile or other units instead of being supported by the raw-fuel tank 2.

In the first embodiment, the first heat exchanger 9 is shaped like a flat sheet, and is superposed on an upper surface of the second heat exchanger 10. The first heat exchanger 9 and the second heat exchanger 10 are combined into one unit.

After passing through the second heat exchanger 10, the low-octane fuel passes through the strainer 36, where foreign substances are removed therefrom. The low-octane fuel then passes through the pressure control valve 37, is sent to the inner bottom of the raw-fuel tank 2, and is mixed with the raw fuel. By mixture of the low-octane fuel with the raw fuel, the octane number of the fuel inside the raw-fuel tank 2 is decreased. When the cycle of separation proceeds (the total amount of raw fuel passing through the separator 6 increases), the octane number of the fuel inside the raw-fuel tank 2 decreases to be closer to the component of the low-octane fuel. The pressure control valve 37 controls the pressures of the raw fuel and the low-octane fuel in the route from the fuel circulating pump 11 to the pressure control valve 37, and thereby maintains a predetermined pressure of the raw fuel in the first chamber 6B of the separator 6. Specifically, when the pressure of the raw fuel (low-octane fuel) increased by the fuel circulating pump 11 becomes higher than or equal to the predetermine pressure, the pressure control valve 37 releases the raw fuel (low-octane fuel) into the raw-fuel tank 2 and thereby maintains the predetermined pressure.

The third heat exchanger 17 exchanges heat between the raw fuel pressure-fed from the fuel circulating pump 11 to the separator 6 and a high-temperature heating medium supplied from the outside of the raw-fuel tank 2 in an unmixed state. The third heat exchanger 17 is used as a heater for heating the raw fuel, and may be a known counterflow heat exchanger. For example, the high-temperature heating medium supplied to the third heat exchanger 17 may be cooling water to be increased in temperature by passing through an internal combustion engine 45, lubricating oil to be increased in temperature by passing through the internal combustion engine 45 and a transmission, automatic fluid, liquid to be increased in temperature by heat exchange with exhaust gas from the internal combustion engine 45, or the exhaust gas. In the first embodiment, the high-temperature heating medium is cooling water for the internal combustion engine 45, and a medium transport pipe 47 communicating with a cooling-water passage 46 in the internal combustion engine 45 is connected to the third heat exchanger 17.

The raw-fuel tank 2 has a first opening 50 and a second opening 51 penetrating the upper wall portion 2A in the thickness direction. The first opening 50 and the second opening 51 are hermetically closed by a first lid 52 and a second lid 53, respectively, to be openable and closable.

The high-octane-fuel tank 5 has a flat shape extending in the horizontal direction. The high-octane-fuel tank 5 is disposed below the recess 2B and above the first heat exchanger 9 and the second heat exchanger 10. The upper wall portion 5A of the high-octane-fuel tank 5 is provided with a passage wall portion 5C cylindrically extending upward to form a passage communicating with the second opening 51. An upper end opening 5D of the passage wall portion 5C is disposed to be aligned with the second opening 51. Thus, when the second lid 53 is opened, the inside of the high-octane-fuel tank 5 communicates with the outside of the raw-fuel tank 2. A portion between an edge portion of the upper end opening 5D of the passage wall portion 5C and an edge portion of the second opening 51 does not always need to be hermetically sealed, and a gap may be provided therebetween.

A first fuel line 56, a first cable bundle 57, a breather pipe 58, and a vapor pipe 60 penetrate the first lid 52. The first fuel line 56 connects the raw-fuel pump 13 and a first injector 55 in the internal combustion engine 45, and the first cable bundle 57 includes a signal line and a power line of the raw-fuel pump 13. The breather pipe 58 connects the gaseous phase part in the upper portion of the raw-fuel tank 2 to an upstream end portion of the fuel filler pipe 2C. The vapor pipe 60 connects the gaseous phase part in the upper portion of the raw-fuel tank 2 to a canister 59. Portions of the first fuel line 56, the first cable bundle 57, the breather pipe 58, and the vapor pipe 60 penetrate the first lid 52 are hermetically sealed.

The breather pipe 58 releases the gas in the raw-fuel tank 2 into the fuel filler pipe 2C to accelerate inflow of the raw fuel into the raw-fuel tank 2 when the raw fuel is supplied through the fuel filler pipe 2C. The vapor pipe 60 releases the fuel vapor in the raw-fuel tank 2 into the canister 59 to keep the pressure inside the raw-fuel tank 2 at an atmospheric pressure. The fuel vapor sent to the canister 59 is adsorbed by activated carbon in the canister 59. The fuel adsorbed in the canister 59 is sucked by a negative pressure received from an intake passage 61 during operation of the internal combustion engine 45, and is burnt in a combustion chamber. A float valve 62 is provided in an end portion of the vapor pipe 60 inside the raw-fuel tank 2. The float valve 62 opens and closes according to the liquid level of the raw fuel inside the raw-fuel tank 2, and this prevents the fuel liquid from flowing into the vapor pipe 60.

A second fuel line 65, a second cable bundle 66, and a medium transport pipe 47 penetrate the second lid 53. The second fuel line 65 connects the high-octane-fuel pump 16 and a second injector 64 in the internal combustion engine 45. The second cable bundle 66 include a signal line and a power line of the high-octane-fuel pump 16. The medium transport pipe 47 circulates the high-temperature heating medium to the third heat exchanger 17. Portions of the second fuel line 65, the second cable bundle 66, and the medium transport pipe 47 that penetrate the second lid 53 are hermetically sealed. The medium transport pipe 47 is connected to the cooling-water passage 46 including a water jacket of the internal combustion engine 45. Through the medium transport pipe 47, water having a relatively high temperature flows.

For example, the second injector 64 may be a port injection injector that injects the fuel to the intake port, and the first injector 55 may be a direct injection injector that injects the fuel to the combustion chamber. A strainer 68 for collecting foreign substances from the fuel is disposed in a portion of the second fuel line 65 closer to the second injector 64 than the second lid 53.

The second cable bundle 66 can include a signal line to the opening/closing valve 33, a signal line and a power line of the fuel circulating pump 11, a signal line and a power line of the vacuum pump 12, and a signal line and a power line of the raw-fuel pump 13. In this case, the second cable bundle 66 preferably extends from the inside of the high-octane-fuel tank 5 into the raw-fuel tank 2 through the communication pipe 5B.

In the fuel separating apparatus 1 having the above-described configuration, the separator 6, the high-octane-fuel tank 5, the first heat exchanger 9, the second heat exchanger 10, the third heat exchanger 17, the buffer tank 8, and the vacuum pump 12 are disposed inside the raw-fuel tank 2. Hence, it is unnecessary to ensure an installation space of these units in addition to the raw-fuel tank 2 in the vehicle body of the automobile. For this reason, the fuel separating apparatus 1 can be disposed in the conventional installation space of the fuel tank.

Next, the first one-way valve 24 and the second one-way valve 25 will be described in detail. The first one-way valve 24 and the second one-way valve 25 have the same structure. For this reason, the first one-way valve 24 will be simply referred to as a one-way valve 24 hereinafter, and the structure of the one-way valve 24 will be described. The second one-way valve 25 may have a different structure. Alternatively, the second one-way valve 25 may have the following structure, and the first one-way valve 24 may have a different structure.

Figure 2:
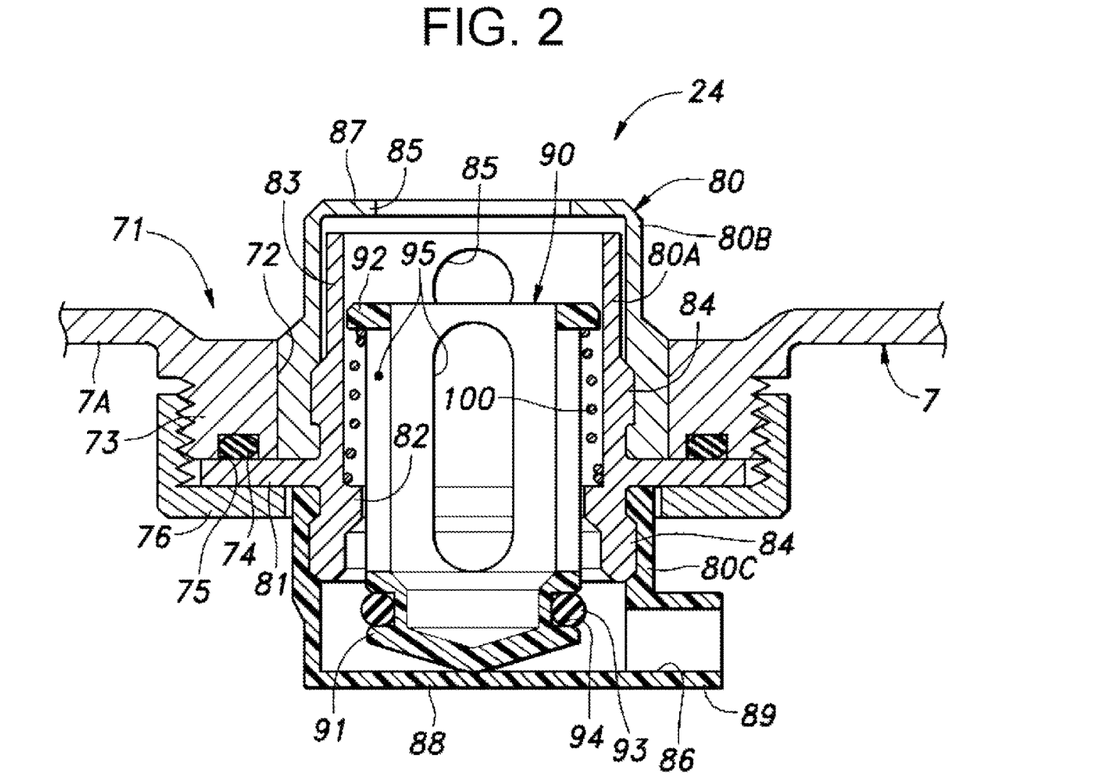
FIG. 2 is a cross-sectional view of a one-way valve illustrated in FIG. 1.

FIG. 2 is a cross-sectional view of the one-way valve 24 in an open state. As illustrated in FIG. 2, a lower surface of the condenser 7 has a valve attachment part 71 to which the one-way valve 24 is attached. The valve attachment part 71 includes a circular attachment hole 72 provided in a bottom wall portion 7A of the condenser 7 and an attachment boss 73 projecting downward around the attachment hole 72. An outer peripheral surface of the attachment boss 73 is externally threaded, and a downward distal end surface of the attachment boss 73 has an annular groove 75 that receives an O-ring 74 serving as a seal member.

The one-way valve 24 has a cylindrical housing 80 (a housing 8) to be attached to the valve attachment part 71 of the condenser 7. The housing 80 includes a housing base 80A in which an attachment flange 81 projecting outward and an inward flange 82 projecting inward are provided integrally with a cylindrical base body 83, an upper housing part 80B fitted on an upper portion of the housing base 80A, and a lower housing part 80C fitted on a lower portion of the housing base 80A.

The housing base 80A is attached to the bottom wall portion 7A of the condenser 7 with the attachment flange 81 being fastened to the attachment boss 73 by a fastening member 76 in a posture such that its axis extends in the vertical direction. The attachment flange 81 is provided at an axial intermediate position of the base body 83 (a position lower than the center in FIG. 2), and the inward flange 82 is provided in a lower part of the base body 83. A lower surface of the inward flange 82 is inclined upward toward the radial inner side. As will be described later, the inward flange 82 serves as a valve seat of the one-way valve 24. An annular projection 84 for engagement of the upper housing part 80B or the lower housing part 80C is provided on each of a portion of an outer surface of the base body 83 above the attachment flange 81 and a portion of the outer surface below the attachment flange 81.

In an upper part of the base body 83 located inside the condenser 7, a fluid inlet 85 is provided to allow inflow of high-octane fuel in a liquid state (hereinafter referred to as liquid fuel). The fluid inlet 85 is formed by a through hole provided in a cylinder wall of the base body 83. A lower end of the fluid inlet 85 has almost the same height as that of a bottom surface of the condenser 7.

The upper housing part 80B is a cylindrical member, and a ring-shaped upper wall 87 having an inner diameter smaller than the inner diameter of the base body 83 is provided integrally with an upper end of the upper housing part 80B. The upper housing part 80B is attached to the housing base 80A so that the upper wall 87 covers the base body 83 from above near an upper end of the base body 83. In the upper housing part 80B, a through hole that serves as the fluid inlet 85 is also provided at a position aligned with the through hole provided in the housing base 80A. In a state in which the liquid fuel is accumulated in the condenser 7, a through hole of the upper wall 87 can serve as the fluid inlet 85.

The lower housing part 80C is a cylindrical member that includes a bottom wall 88 provided integrally therewith and a fluid outlet 86 from which the liquid fuel flows out. In the first embodiment, the fluid outlet 86 is provided in a cylinder wall, and is provided integrally with the lower housing part 80C so that a connecting pipe 89 for connecting the conduit 22 protrudes sideward from an outer surface of the cylinder wall. In the other embodiments, the fluid outlet 86 may be provided in the bottom wall 88 of the lower housing part 80C.

Inside the housing 80, a shaft-shaped valve member 90 is stored movably in the axial direction of the housing 80, that is, in the vertical direction. The valve member 90 has a valve body 91 shaped like a bottomed cylinder opening upward, and an outward flange 92 provided integrally with an upper end portion of the valve body 91 and projecting outward. The valve body 91 has an outer diameter slightly smaller than the inner diameter of the inward flange 82 of the housing 80. On the other hand, the outward flange 92 has an outer diameter slightly smaller than the inner diameter of the base body 83 of the housing 80. Thus, when the valve member 90 moves up and down, an outer edge of the outward flange 92 at the upper end is guided by the housing 80, and the valve body 91 is guided by an inner edge of the inward flange 82 of the housing 80.

A compression coil spring 100 is provided to surround the valve body 91 between the inward flange 82 of the housing 80 and the outward flange 92 of the valve member 90. Thus, the valve member 90 constantly receives an upward spring force from the compression coil spring 100. In a state in which the liquid fuel is not accumulated in the condenser 7, the valve member 90 is in contact with the upper wall 87 of the housing 80. That is, the upper wall 87 of the housing 80 serves as a stopper for regulating the upper end position of the valve member 90. In a state in which the liquid fuel is accumulated in the condenser 7, the valve member 90 is in contact with the bottom wall 88 of the housing 80 in a state of FIG. 2. That is, the bottom wall 88 of the housing 80 serves as a stopper for regulating the lower end position of the valve member 90.

In an outer peripheral surface of the lower part of the valve body 91, an annular groove 94 is provided to receive an O-ring 93. The O-ring 93 is in contact with the entire inner peripheral edge (an inner surface or a lower end of an inclined lower surface) of the inward flange 82 of the housing 80 when the valve member 90 is at the upper end position. By this contact, the one-way valve 24 is brought into a closed state. In the closed state, the O-ring 93 provided on the valve member 90 is in contact with the inner edge of the inward flange 82 of the housing 80 serving as the valve seat. This ensures sealability of the one-way valve 24.

In a portion of the valve body 91 above the annular groove 94, a plurality of slits 95 penetrating the cylinder wall extend in the up-down direction. When the valve body 91 is moved downward against the spring force of the compression coil spring 100 by the weight (pressure) of liquid fuel flowing from the fluid inlet 85 into the housing 80 and the cylindrical valve member 90 (valve opening), the slits 95 cause the inside of the valve member 90 to communicate with a space in the housing 80 below the inward flange 82 so that the liquid fuel is discharged from the inside of the valve member 90. The liquid fuel discharged to the lower part of the housing 80 through the slits 95 of the valve member 90 flows from the fluid outlet 86 to the buffer tank 8 (FIG. 1) through the conduit 22 (FIG. 1) by gravity.

Figure 3:
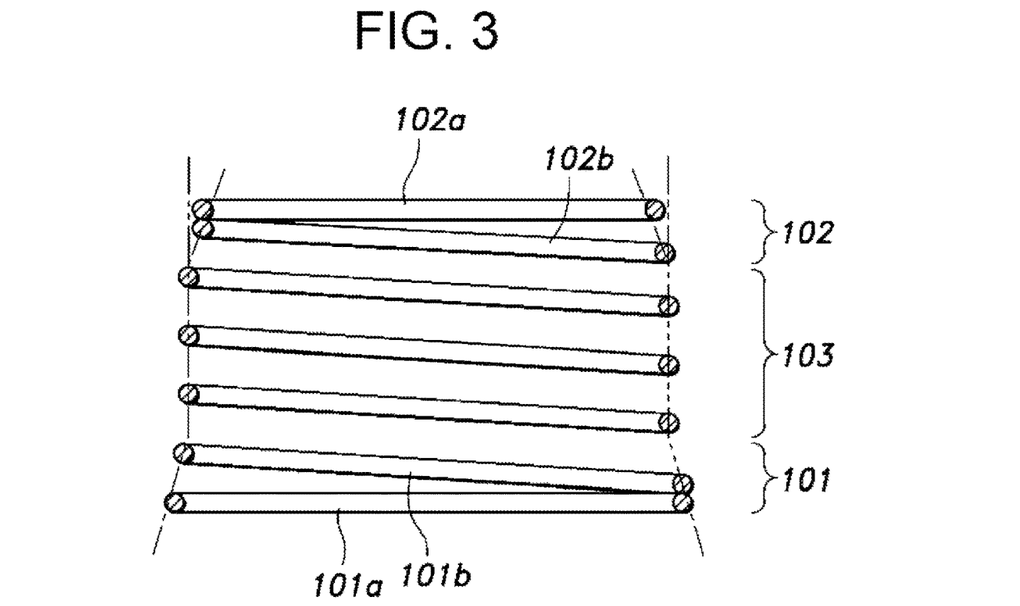
FIG. 3 is a perspective view of a compression coil spring illustrated in FIG. 2.

As also illustrated in FIG. 3, the compression coil spring 100 includes a large-diameter portion 101 (a first axial end 101), a small-diameter portion 102 (a second axial end 102), and a body portion 103. The large-diameter portion 101 is provided at a lower end of the compression coil spring 100 to be in contact with an outer edge portion of the inward flange 82 of the housing 80 and an inner peripheral surface (a peripheral side wall) of the housing 80. The small-diameter portion 102 is provided at an upper end of the compression coil spring 100 to be in contact with an inner edge portion of the outward flange 92 of the valve member 90 and an outer peripheral surface of the valve member 90. The body portion 103 is provided in an intermediate portion between the large-diameter portion 101 and the small-diameter portion 102, and has a diameter larger than that (a second diameter) of the small-diameter portion 102 and smaller than that (a first diameter) of the large-diameter portion 101.

The large-diameter portion 101 includes an end turn portion 101a (lower closed-end portion) formed by bending an element wire in one turn with a single curvature, and a conical portion 101b formed by bending the element wire while increasing the curvature from the end turn portion 101a until the curvature reaches the curvature of the body portion 103. The small-diameter portion 102 includes an end turn portion 102a (upper closed-end portion) formed by bending the element wire in one turn with a single curvature, and a conical portion 102b formed by bending the element wire while decreasing the curvature from the end turn portion 102a until the curvature reaches the curvature of the body portion 103. The end turn portions 101a and 102a of the large-diameter portion 101 and the small-diameter portion 102 may be subjected to grinding or tapering to have flat seating surfaces, or may not be machined so that a part of one turn thereof does not serve as the seating surface. The body portion 103 is formed by bending the element wire in a predetermined number of turns with a single curvature.

The diameter of the end turn portion 101a of the large-diameter portion 101 is substantially equal to the inner diameter of the base body 83 of the housing 80. The diameter of the end turn portion 102a of the small-diameter portion 102 is substantially equal to the outer diameter of the valve body 91. The average coil diameter of the body portion 103 is set to be an intermediate value (preferably a center value) between the inner diameter of the base body 83 of the housing 80 and the outer diameter of the valve body 91. Therefore, the large-diameter portion 101 is held by the housing 80 while being in contact with the outer edge portion of the inward flange 82 of the housing 80 and the outer peripheral surface of the base body 83. The small-diameter portion 102 is held by the valve member 90 while being in contact with the inner edge portion of the outward flange 92 of the valve member 90 and the outer peripheral surface of the valve body 91. The body portion 103 is in contact with neither the housing 80 nor the valve member 90. Thus, the compression coil spring 100 is fixedly supported at both ends by the inward flange 82 of the housing 80 and the outward flange 92 of the valve member 90. This suppresses tilt of the compression coil spring 100.

The compression coil spring 100 is set to apply a spring force slightly larger than a load of the valve member 90 (that is, the sum of the weight of the valve member 90 and the weight of liquid fuel accumulated to the lower ends of the slits 95 inside the valve member 90) to the valve member 90 when the valve member 90 is at the upper end position serving as the valve closing position. When the liquid fuel is accumulated and pressure acts on the bottom surface of the valve member 90, the one-way valve 24 starts to open (the valve member 90 moves downward). The spring constant of the compression coil spring 100 is set at, for example, about $2\times10^{-3}$ N/mm (for example, to an extent such that the compression coil spring 100 is compressed by 40 mm when the valve member 90 receives a pressure of 30 mmAq (=294 Pa).

Hereinafter, a description will be given of operational effects of the one-way valve 24 and the fuel separating apparatus 1 having the above-described structures.

In the one-way valve 24 of the first embodiment, the compression coil spring 100 is provided to surround the valve member 90 between the inward flange 82 of the housing 80 and the outward flange 92 of the valve member 90. The compression coil spring 100 includes the large-diameter portion 101 provided at one axial end to be in contact with the outer edge portion of the inward flange 82 and the inner peripheral surface of the housing 80, the small-diameter portion 102 provided at the other axial end to be in contact with the inner edge portion of the outward flange 92 and the outer peripheral surface of the valve member 90, and the body portion 103 provided in the axial intermediate portion and having a diameter larger than that of the small-diameter portion 102 and smaller than that of the large-diameter portion 101. Thus, the compression coil spring 100 rarely tilts, as described above. Hence, it is possible to decrease the wire diameter of the compression coil spring 100 to make the spring constant small, and the one-way valve 24 smoothly opens and closes even when the differential pressure is minute.

To hold the lower end and the upper end of the compression coil spring 100 by the housing 80 and the valve member 90, it is conceivable to adopts a structure in which the compression coil spring 100 does not include the large-diameter portion 101 and the small-diameter portion 102 and in which the lower end of the compression coil spring 100 is held by a projection provided on the inner surface of the base body 83 of the housing 80 near the inward flange 82 and the upper end of the compression coil spring 100 is held by a projection provided on the outer surface of the valve body 91 near the outward flange 92. In such a structure, however, the projection provided on the housing 80 interferes with the outward flange 92 of the valve member 90, and the projection provided on the valve member 90 interferes with the inward flange 82. Hence, the stroke of the valve member 90 is reduced. In contrast, in the one-way valve 24 of the first embodiment, since the compression coil spring 100 includes the large-diameter portion 101 and the small-diameter portion 102 and is held by the housing 80 and the valve member 90, the stroke of the valve member 90 is not reduced.

Further, in the first embodiment, the housing 80 is provided in a posture such that its axis extends in the vertical direction. For this reason, the valve member 90 moves in the vertical direction, and is not tilted by its own weight into contact with the housing 80. Thus, the one-way valve 24 smoothly opens and closes at a small differential pressure.

The valve member 90 has the cylindrical valve body 91 guided by the inner edge of the inward flange 82, and the outer edge of the outward flange 92 is guided by the inner surface of the housing 80. For this reason, even when the compression coil spring 100 tilts, since the valve body 91 and the outward flange 92 are guided, tilt of the valve member 90 is restricted, and the valve member 90 smoothly moves.

The valve member 90 is movable between the upper valve closing position and the lower valve opening position, and the compression coil spring 100 is set to apply a spring force larger than the load of the valve member 90 to the valve member 90 when the valve member 90 is at the valve closing position. For this reason, even when the differential pressure is minute, the valve member 90 opens and closes well, and the wire diameter of the compression coil spring 100 can be made relatively large. This properly prevents tilt of the compression coil spring 100.

The valve member 90 has the annular O-ring 93 in contact with the inner edge of the inward flange 82. For this reason, sealability is enhanced when the valve member 90 is at the valve closing position.

The fuel separating apparatus 1 of the first embodiment includes the separator 6 that separates the raw fuel into high-octane fuel and low-octane fuel, the condenser 7 that condenses the high-octane fuel in a gaseous state separated from the raw fuel, the high-octane-fuel tank 5 that stores the condensed high-octane fuel in a liquid state, and the one-way valve 24 having the above-described structure and provided at the position lower than the condenser 7 in the conduit 22 to permit only the flow of high-octane fuel from the condenser 7 toward the high-octane-fuel tank 5. The separator 6, the condenser 7, the high-octane-fuel tank 5, and the one-way valve 24 are provided inside the raw-fuel tank 2 that stores the raw fuel. Thus, even when the differential pressure is small, the one-way valve 24 opens and closes, and the high-octane fuel condensed by the condenser 7 flows toward the high-octane-fuel tank 5 by gravity. For this reason, the one-way valve 24 can be disposed at the position lower than the condenser 7 and near the condenser 7. This can reduce the height of the raw-fuel tank 2.

Second Embodiment

Next, a one-way valve 124 according to a second embodiment will be described with reference to FIG. 4. Since the overall configuration of a fuel separating apparatus 1 is common, a description thereof is skipped. Also, elements having forms or functions identical or similar to those of the first embodiment are denoted by the same signs or signs corresponding in the last two digits, and redundant descriptions thereof are appropriately skipped.

The one-way valve 124 according to the second embodiment includes a cylindrical housing 180 connected to a condenser 7 (FIG. 1) by a conduit 22. The housing 180 includes a cylindrical housing body 183 disposed with its axis extending in the vertical direction and having both axial ends closed by an upper wall 187 and a bottom wall 188, and an annular projecting portion 181 projecting inward from an inner surface of an upper intermediate portion of the housing body 183 to serve as a valve seat. An upper surface of the annular projecting portion 181 is an inclined surface inclined upward toward the radial inner side. A fluid inlet 184 is provided at a lower end of a cylinder wall of the housing body 183, and a fluid outlet 186 is provided in a portion of the cylinder wall of the housing body 183 higher than the annular projecting portion 181.

Inside the housing 180, a shaft-shaped valve member 190 is stored movably in the axial direction of the housing 180, that is, in the vertical direction. The valve member 190 includes a valve body 191 shaped like a bottomed cylinder opening upward, and an outward flange 192 provided integrally with a portion of the valve body 191 near a lower end and projecting outward. On an outer peripheral surface of an upper part of the valve body 191, an annular groove 194 is provided to receive an O-ring 193. In a portion of the valve body 191 lower than the annular groove 194, a plurality of slits 195 penetrating a cylinder wall extend in the up-down direction. The valve body 191 has an outer diameter slightly smaller than the inner diameter of the annular projecting portion 181 of the housing 180. On the other hand, the outward flange 192 has an outer diameter slightly smaller than the inner diameter of the housing body 183. Thus, when the valve member 190 moves up and down, an outer edge of the outward flange 192 at the lower end is guided by the housing body 183, and the valve body 191 is guided by an inner edge of the annular projecting portion 181 of the housing 180.

Between the bottom wall 188 of the housing 180 and the outward flange 192 of the valve member 190, a compression coil spring 100 is provided to surround a portion of the valve member 190 lower than the outward flange 192 (a lower end of the valve body 191). Thus, the valve member 190 constantly receives an upward spring force from the compression coil spring 100. That is, a peripheral edge portion of the bottom wall 188 of the housing 180 serves as a seating surface of the compression coil spring 100, and performs a part of the function of the inward flange 82 in the first embodiment.

The compression coil spring 100 has a structure similar to that of the first embodiment. That is, the compression coil spring 100 includes a large-diameter portion 101 provided at a lower end to be in contact with the outer edge portion of the bottom wall 188 (inward flange 182 or coil spring support portion 182) of the housing 180 and an inner peripheral surface of the housing 180, a small-diameter portion 102 provided at an upper end to be in contact with an inner edge portion of the outward flange 192 of the valve member 190 and an outer peripheral surface of the valve member 190, and a body portion 103 provided in an intermediate portion between the large-diameter portion 101 and the small-diameter portion 102 and having a diameter larger than that of the small-diameter portion 102 and smaller than that of the large-diameter portion 101.

The diameter of an end turn portion 101*a* of the large-diameter portion 101 is substantially equal to the inner diameter of the housing body 183. The diameter of an end turn portion 102*a* of the small-diameter portion 102 is substantially equal to the outer diameter of the valve body 191. The average coil diameter of the body portion 103 is an intermediated value (preferably a center value) between the inner diameter of the housing body 183 and the outer diameter of the valve body 191. Therefore, the large-diameter portion 101 is in contact with the outer edge portion of the bottom wall 188 (inward flange 182) of the housing 180 and is held by the housing body 183. The small-diameter portion 102 is in contact with the inner edge portion of the outward flange 192 of the valve member 190, and is held by the valve body 191. Also, the body portion 103 is in contact with neither the housing 180 nor the valve member 190. Thus, the compression coil spring 100 is fixedly supported at both ends by the bottom wall 188 (inward flange 182) of the housing 180 and the outward flange 192 of the valve member 190. This suppresses tilt of the compression coil spring 100.

Figure 4:
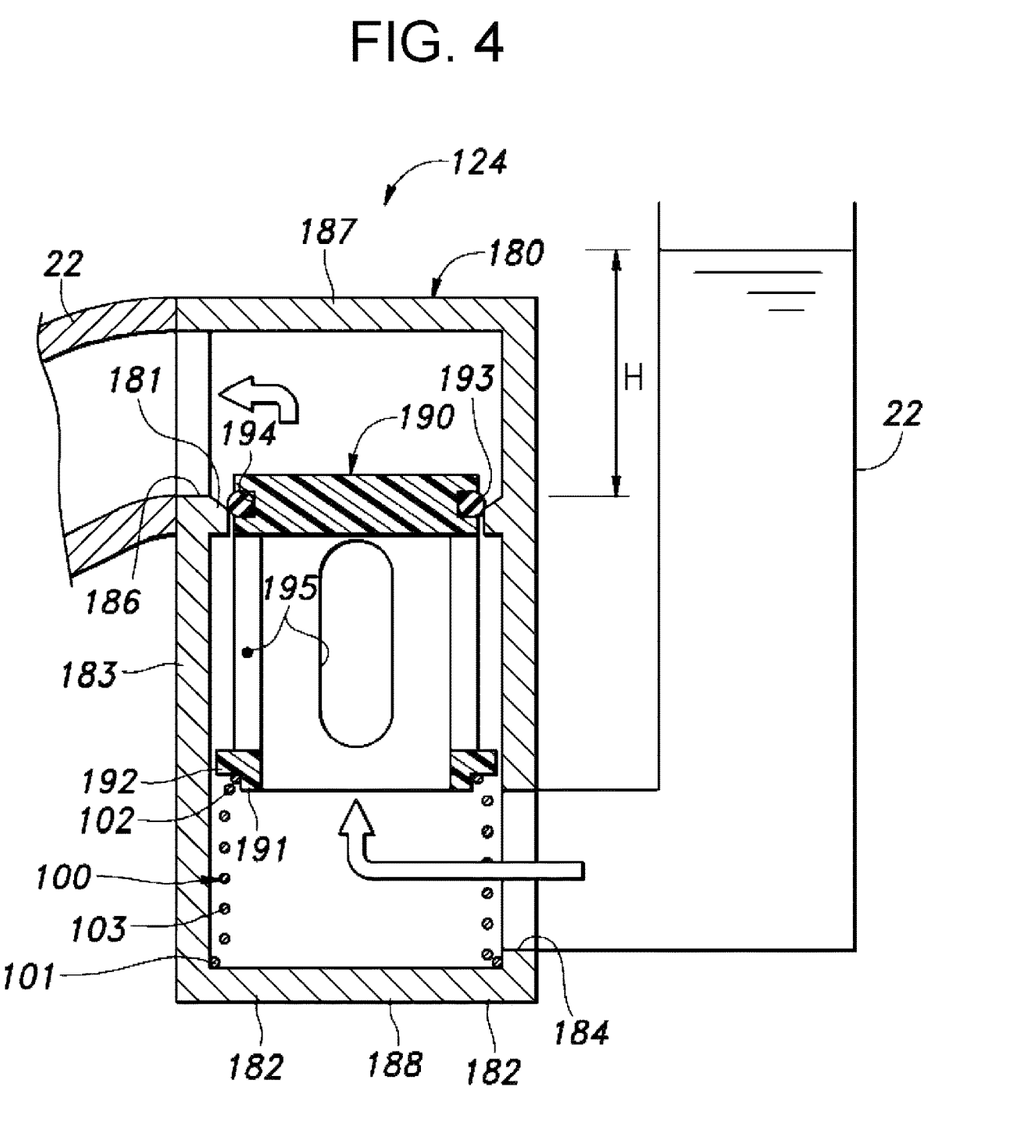
FIG. 4 is a cross-sectional view of a one-way valve according to a second embodiment.

In a state in which liquid fuel is not accumulated in the condenser 7 and the liquid level of the liquid fuel in the conduit 22 is lower than a lower end of the fluid outlet 186, the O-ring 193 provided on the valve member 190 is in contact with the entire inner peripheral edge of the annular projecting portion 181 in a state of FIG. 4. That is, the compression coil spring 100 is set to apply a spring force smaller than the load of the valve member 190 (that is, a value obtained by subtracting buoyancy from the weight of the valve member 190) to the valve member 190 when the valve member 190 is at a lower valve closing position. Thus, the one-way valve 124 is brought into a closed state. That is, the annular projecting portion 181 of the housing 180 serves as a stopper for regulating the lower end position of the valve member 190. Alternatively, the O-ring 193 may be in contact with the annular projecting portion 181, and an unillustrated extended portion of the valve body 191 extending downward may be in contact with the bottom wall 188 of the housing 180.

When the liquid fuel is accumulated in the upstream conduit 22 and the liquid level of the liquid fuel reaches a height from the lower end of the fluid outlet 186 larger than or equal to a predetermined water head difference H, the valve member 190 is moved upward by the pressure difference. Thus, the O-ring 193 separates from the annular projecting portion 181, and the slits 195 protrude upward from the annular projecting portion 181. Consequently, the liquid fuel passes through the annular projecting portion 181 serving as the valve seat and flows to the downstream conduit 22. When the pressure difference is large, the valve member 190 is in contact with the upper wall 187 of the housing 180. That is, the upper wall 187 of the housing 180 serves as a stopper for regulating the upper end position of the valve member 190.

The compression coil spring 100 is preferably set to apply an upward spring force to the valve member 190 even in a state in which the valve member 190 is in contact with the upper wall 187 of the housing 180. By such setting, the holding by the housing 180 or the holding by the valve member 190 is prevented from being released by displacement of the large-diameter portion 101 or the small-diameter portion 102.

The one-way valve 124 having this structure can obtain operational effects similar to those of the first embodiment. In the second embodiment, the valve member 190 is provided movably between the lower valve closing position and the upper valve opening position, and the compression coil spring 100 is set to apply a spring force smaller than the load of the valve member 190 to the valve member 190 when the valve member 190 is at the valve closing position. That is, the valve member 190 is biased to the valve closing position by gravity. For this reason, even if the spring force is reduced by degradation of the compression coil spring 100, the one-way valve 124 is prevented from opening to cause a backflow when there is no pressure difference or when the pressure on the downstream side is high.

Third Embodiment

Next, a one-way valve 224 according to a third embodiment will be described with reference to FIG. 5. Elements having forms or functions identical or similar to those of the first embodiment are denoted by the same signs or signs corresponding in the last two digits, and redundant descriptions thereof are appropriately skipped.

Figure 5:
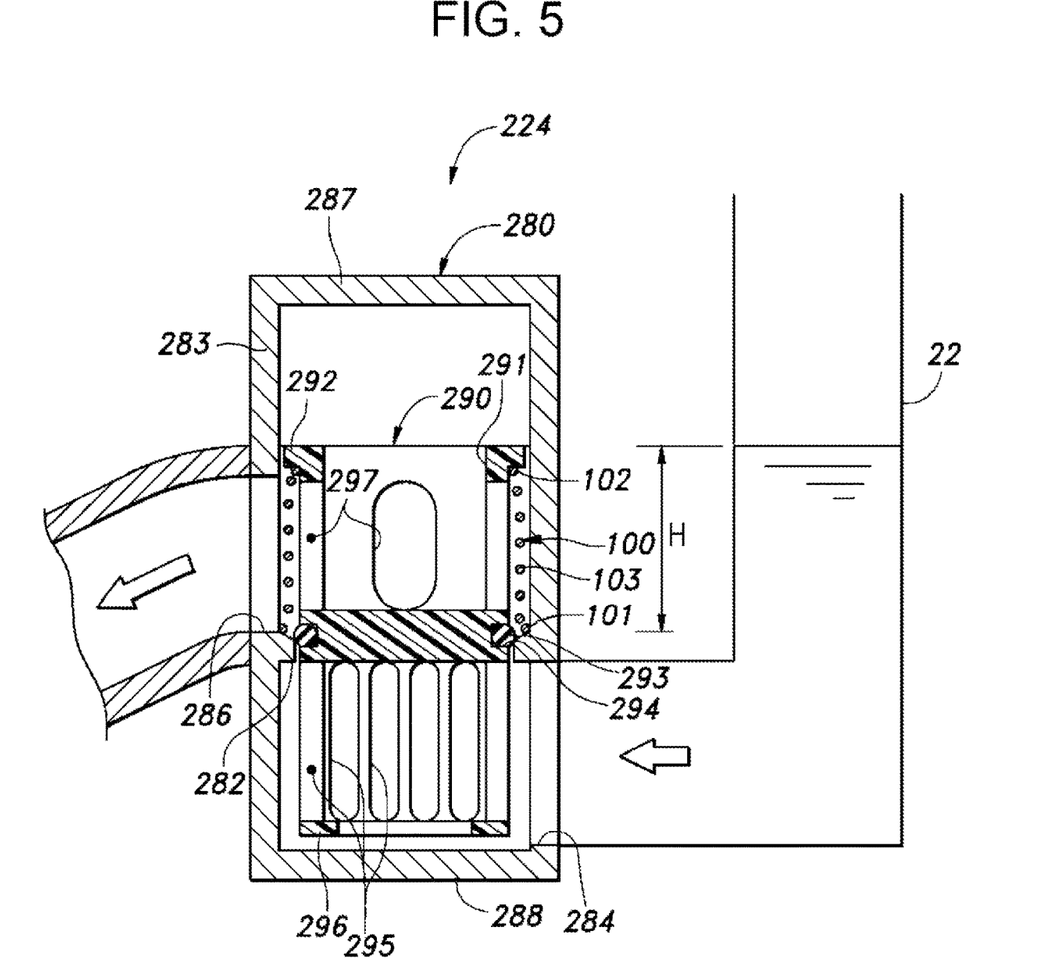
FIG. 5 is a cross-sectional view of a one-way valve according to a third embodiment.

As illustrated in FIG. 5, in the one-way valve 224 of the third embodiment, a housing 280 includes a cylindrical housing body 283 with both axial ends closed by an upper wall 287 and a bottom wall 288, and an inward flange 282 projecting inward from an inner surface of a lower intermediate portion of the housing body 283 to serve as a valve seat. An upper surface of the inward flange 282 is an inclined surface inclined upward toward the radial inner side. A fluid inlet 284 is provided in a portion of a cylinder wall of the housing body 283 lower than the inward flange 282, and a fluid outlet 286 is provided at a lower end of a portion of the cylinder wall of the housing body 283 higher than the inward flange 282.

Inside the housing 280, a shaft-shaped valve member 290 is stored movably in the axial direction of the housing 280. The valve member 290 includes a valve body 291 shaped like a bottomed cylinder opening upward, an outward flange 292 provided integrally with an upper end of the valve body 291 and projecting outward, and an extended cylindrical portion 296 provided integrally with the valve body 291 to extend the valve body 291 downward and guided by the inward flange 282 of the housing 280. On an outer peripheral surface of a lower end of the valve body 291, an annular groove 294 is provided to receive an O-ring 293. In a portion of the extended cylindrical portion 296 lower than the annular groove 294, a plurality of slits 295 penetrating the cylinder wall extend in the up-down direction. In a portion of the valve body 291 higher than the annular groove 294, a plurality of slit-shaped breathing holes 297 are also provided to penetrate the cylinder wall. The breathing holes 297 cause an inner space of the housing 280 higher than the valve member 290 to communicate with a downstream conduit 22, and secure the operation of the valve member 290. The valve body 291 and the extended cylindrical portion 296 have outer diameters slightly smaller than the inner diameter of the inward flange 282 of the housing 280. On the other hand, the outward flange 292 has an outer diameter slightly smaller than the inner diameter of the housing body 283. Thus, when the valve member 290 moves up and down, an outer edge of the outward flange 292 at the upper end is guided by the housing body 283, and the extended cylindrical portion 296 is guided by an inner edge of the inward flange 282 of the housing 280.

Between the inward flange 282 of the housing 280 and the outward flange 292 of the valve member 290, a compression coil spring 100 is provided to surround the valve body 291. Thus, the valve member 290 constantly receives an upward spring force from the compression coil spring 100. The compression coil spring 100 has a structure similar to those of the first and second embodiments. In the third embodiment, a large-diameter portion 101 is also in contact with an outer edge portion of the inward flange 282 of the housing 280 and is held by the housing body 283, and a small-diameter portion 102 is also in contact with an inner edge portion of the outward flange 292 of the valve member 290 and an outer peripheral surface of the valve body 291. A body portion 103 is in contact with neither the housing 280 nor the valve member 290. Thus, the compression coil spring 100 is fixedly supported at both ends by the inward flange 282 of the housing 280 and the outward flange 292 of the valve member 290. This suppresses tilt of the compression coil spring 100.

In a state in which liquid fuel is not accumulated in a condenser 7 and the liquid level of the liquid fuel in the conduit 22 is lower than a lower end of the fluid outlet 286, the O-ring 293 provided on the valve member 290 is in contact with the entire inner peripheral edge of the inward flange 282 in a state of FIG. 5. That is, the compression coil spring 100 is set to apply a spring force smaller than the load of the valve member 290 to the valve member 290 when the valve member 290 is at a lower valve closing position. Thus, the one-way valve 224 is brought into a closed state. That is, the inward flange 282 of the housing 280 serves as a stopper for regulating the lower end position of the valve member 290. Alternatively, the O-ring 293 may be in contact with the inward flange 282 and the extended cylindrical portion 296 provided integrally with the valve body 291 may be in contact with the bottom wall 288 of the housing 280.

When the liquid fuel is accumulated in the upstream conduit 22 and the liquid level of the liquid fuel reaches a height from the lower end of the fluid outlet 286 larger than or equal to a predetermined water head difference H, the valve member 290 is moved upward by the pressure difference. Thus, the O-ring 293 separates from the inward flange 282, and the slits 295 protrude upward from the inward flange 282. Hence, the liquid fuel passes through the inward flange 282 serving as the valve seat and flows to the downstream conduit 22. When the pressure difference is large, the valve member 290 is in contact with the upper wall 287 of the housing 280. That is, the upper wall 287 of the housing 280 serves as a stopper for regulating the upper end position of the valve member 290.

In the third embodiment, the compression coil spring 100 is also preferably set to apply an upward spring force to the valve member 290 even in a state in which the valve member 290 is in contact with the upper wall 287 of the housing 280. By such setting, the holding by the housing 280 or the holding by the valve member 290 is prevented from being released by displacement of the large-diameter portion 101 or the small-diameter portion 102.

The one-way valve 224 having this structure can obtain operational effects similar to those of the first and second embodiments. In the third embodiment, the valve member 290 is also provided movably between the lower valve closing position and the upper valve opening position, and the compression coil spring 100 is set to apply a spring force smaller than the load of the valve member 290 to the valve member 290 when the valve member 290 is at the valve closing position. That is, the valve member 290 is biased to the valve closing position by gravity. For this reason, even when the spring force is reduced by degradation of the compression coil spring 100, the one-way valve 224 does not open to cause a backflow when there is no pressure difference or when the pressure on the downstream side is high.

While the specific embodiments have been described above, the present disclosure is not limited to the embodiments, and various alterations and modifications are possible. For example, while the one-way valve is applied to the fuel separating apparatus as an example in the above embodiments, it may be applied to other apparatuses. Also, the fluid that flows through the one-way valve is not limited to liquid. Further, specific structures, arrangements, numbers, angles, and so on of the members and portions can be appropriately changed without departing from the scope of the disclosure. On the other hand, all of the constituent elements in the above-described embodiments are not essential, but may be selected appropriately.

The present disclosure describes a one-way valve that can smoothly open and close even at a small differential pressure and can be reduced in size, and a fuel separating apparatus including the one-way valve.

A one-way valve according to an aspect of the present disclosure includes a cylindrical housing having an inward flange, a shaft-shaped valve member stored in the housing to be movable in an axial direction of the housing and having an outward flange, and a coil spring provided between the inward flange and the outward flange to surround at least a part of the valve member. The coil spring includes a large-diameter portion provided at one axial end to be in contact with an outer edge portion of the inward flange and an inner peripheral surface of the housing, a small-diameter portion provided at the other axial end to be in contact with an inner edge portion of the outward flange and an outer peripheral surface of the valve member, and a body portion provided in an axial intermediate portion and having a diameter larger than a diameter of the small-diameter portion and smaller than a diameter of the large-diameter portion.

According to this structure, since the large-diameter portion at one end of the coil spring is held by the housing and the small-diameter portion at the other end is held by the valve member, the coil spring rarely tilts. Hence, the spring constant can be set to be small by decreasing the wire diameter of the coil spring, and the one-way valve smoothly opens and closes even when the differential pressure is minute. Also, since the coil spring has the large-diameter portion and the small-diameter portion and is held by the housing and the valve member, the stroke of the valve member is not reduced.

Preferably, the housing is provided in a posture such that an axis of the housing extends in a vertical direction.

According to this structure, since the valve member moves in the vertical direction, it does not tilt by its own weight into contact with the housing. Thus, the one-way vale smoothly opens and closes at a small differential pressure.

Preferably, the valve member has a cylindrical valve body guided by an inner edge of the inward flange, and an outer edge of the outward flange is guided by the inner peripheral surface of the housing.

According to this structure, even when the coil spring tilts, the valve body and the outward flange are guided. Hence, tilt of the valve member is restricted, and the valve member smoothly moves.

Preferably, the valve member is movable between an upper valve closing position and a lower valve opening position, and the coil spring is set to apply a spring force larger than a load of the valve member to the valve member when the valve member is at the valve closing position.

According to this structure, even when the differential pressure is minute, the wire diameter of the coil spring can be made relatively large while ensuring proper opening and closing operations of the valve member. This can satisfactorily prevent tilt of the coil spring.

Preferably, the valve member is movable between an upper valve closing position and a lower valve opening position, and the coil spring is set to apply a spring force smaller than a load of the valve member to the valve member when the valve member is at the valve closing position.

According to this structure, since the valve member is biased to the valve closing position by gravity, backflow is not produced even when the spring force is reduced by degradation of the coil spring.

Preferably, the valve member has an annular seal member in contact with an inner edge of the inward flange.

According to this structure, it is possible to enhance sealability when the valve member is at the valve closing position.

A fuel separating apparatus according to a further aspect of the present disclosure includes a raw-fuel tank that stores raw fuel, a separator provided inside the raw-fuel tank to separate the raw fuel into a high-octane fuel containing more high-octane components than the raw fuel and a low-octane fuel containing more low-octane components than the raw fuel, a condenser provided inside the raw-fuel tank to condense the high-octane fuel in a gaseous state separated by the separator, a high-octane-fuel tank provided inside the raw-fuel tank to store the high-octane fuel in a liquid state condensed by the condenser, and the one-way valve provided at a position lower than the condenser in a conduit that connects the condenser and the high-octane-fuel tank to permit only a flow of the high-octane fuel from the condenser toward the high-octane-fuel tank.

According to this structure, even when the differential pressure is small, the one-way valve can be opened and closed to cause the high-octane fuel condensed by the condenser to flow toward the high-octane-fuel tank. Hence, the one-way valve can be disposed at a position lower than the condenser and near the condenser. This can reduce the height of the raw-fuel tank.

Obviously, numerous modifications and variations of the present invention are possible in light of the above teachings. It is therefore to be understood that within the scope of the appended claims, the invention may be practiced otherwise than as specifically described herein.

What is claimed is:

1. A one-way valve comprising:
   a cylindrical housing having a center axis and comprising:
      an upper wall;
      a bottom wall opposite to the upper wall along the center axis;
      a peripheral side wall provided around the center axis and connecting the upper wall and the bottom wall; and
      an inward flange protruding from the peripheral side wall toward the center axis;
   a valve member stored in the housing to be movable in an axial direction along the center axis, the valve member being shaft-shaped and comprising:
      a top end;
      a bottom end opposite to the top end in the axial direction; and
      an outward flange provided between the inward flange and the upper wall in the axial direction; and
   a coil spring provided between the inward flange and the outward flange to surround at least a part of the valve member,
   wherein the coil spring includes a large-diameter portion provided at one axial end of the coil spring to be in contact with an outer edge portion of the inward flange and an inner peripheral surface of the housing, a small-diameter portion provided at the other axial end of the coil spring to be in contact with an inner edge portion of the outward flange and an outer peripheral surface of the valve member, and a body portion provided in an axial intermediate portion and having a diameter larger than a diameter of the small-diameter portion and smaller than a diameter of the large-diameter portion, and
   wherein the bottom end of the valve member is configured to contact the bottom wall when the one-way valve is opened.

2. The one-way valve according to claim 1, wherein the housing is provided in a posture such that an axis of the housing extends in a vertical direction.

3. The one-way valve according to claim 2,
wherein the valve member has a cylindrical valve body guided by an inner edge of the inward flange, and
wherein an outer edge of the outward flange is guided by the inner peripheral surface of the housing.

4. The one-way valve according to claim 2,
wherein the valve member is movable between an upper valve closing position and a lower valve opening position, and
wherein the coil spring is set to apply a spring force larger than a load of the valve member to the valve member when the valve member is at the valve closing position.

5. The one-way valve according to claim 2,
wherein the valve member is movable between a lower valve closing position and an upper valve opening position, and
wherein the coil spring is set to apply a spring force smaller than a load of the valve member to the valve member when the valve member is at the valve closing position.

6. The one-way valve according to claim 1, wherein the valve member has an annular seal member in contact with an inner edge of the inward flange.

7. A fuel separating apparatus comprising:
a raw-fuel tank that stores raw fuel;
a separator provided inside the raw-fuel tank to separate the raw fuel into a high-octane fuel containing more high-octane components than the raw fuel and a low-octane fuel containing more low-octane components than the raw fuel;
a condenser provided inside the raw-fuel tank to condense the high-octane fuel in a gaseous state separated by the separator;
a high-octane-fuel tank provided inside the raw-fuel tank to store the high-octane fuel in a liquid state condensed by the condenser; and
the one-way valve according to claim 1, the one-way valve being provided at a position lower than the condenser in a conduit that connects the condenser and the high-octane-fuel tank to permit only a flow of the high-octane fuel from the condenser toward the high-octane-fuel tank.

8. The one-way valve according to claim 1, wherein the bottom end has a pointed shape.

9. A one-way valve comprising:
a housing having a substantially cylindrical shape with a center axis and comprising:
an upper wall;
a bottom wall opposite to the upper wall along the center axis;
a peripheral side wall provided around the center axis and connecting the upper wall and the bottom wall; and
an inward flange protruding from the peripheral side wall toward the center axis;
a valve member inserted into the housing to be movable along the center axis and comprising:
a top end;
a bottom end provided opposite to the top end along the center axis and configured to contact the bottom wall when the one-way valve is opened;
an outer peripheral surface provided around the center axis between the top end and the bottom end, the outer peripheral surface facing the inward flange in a radial direction perpendicular to the center axis; and
an outward flange protruding from the outer peripheral surface toward the peripheral side wall between the inward flange and the upper wall along the center axis; and
a coil spring provided between the inward flange and the outward flange along the center axis to surround the valve member and comprising:
a first axial end having a first diameter and being in contact with the inward flange and the peripheral side wall;
a second axial end having a second diameter smaller than a first diameter, the second axial end being opposite to the first axial end along the center axis and being in contact with the outward flange and the outer peripheral surface; and
a body portion provided between the first axial end and the second axial end along the center axis and having diameters decreasing from the first diameter to the second diameter.

10. The one-way valve according to claim 9, wherein the housing is provided in a posture such that the center axis extends in a vertical direction.

11. The one-way valve according to claim 10,
wherein the valve member has a cylindrical valve body to be guided by an inner edge of the inward flange, and
wherein an outer edge of the outward flange is guided by the peripheral side wall.

12. The one-way valve according to claim 10,
wherein the valve member is movable between a valve closing position and a valve opening position lower than the valve closing position in the vertical direction, and
wherein the coil spring is configured to apply a spring force larger than a load of the valve member to the valve member when the valve member is at the valve closing position.

13. The one-way valve according to claim 10,
wherein the valve member is movable between a valve closing position and a valve opening position upper than the valve closing position in the vertical direction, and
wherein the coil spring is configured to apply a spring force smaller than a load of the valve member to the valve member when the valve member is at the valve closing position.

14. The one-way valve according to claim 9, wherein the valve member comprises an annular seal member in contact with an inner edge of the inward flange.

15. A fuel separating apparatus comprising:
a raw-fuel tank to store raw fuel;
a separator provided inside the raw-fuel tank to separate the raw fuel into a high-octane fuel and a low-octane fuel, the high-octane fuel containing more high-octane components than the raw fuel, the low-octane fuel containing more low-octane components than the raw fuel;
a condenser provided inside the raw-fuel tank to condense the high-octane fuel in a gaseous state separated by the separator;
a high-octane-fuel tank provided inside the raw-fuel tank to store the high-octane fuel in a liquid state condensed by the condenser; and
the one-way valve according to claim 9, the one-way valve being provided at a position lower than the condenser in a conduit connecting the condenser and the high-octane-fuel tank to permit only a flow of the high-octane fuel from the condenser toward the high-octane-fuel tank.

16. The one-way valve according to claim 9, wherein the valve member is shaped like a shaft.

17. The one-way valve according to claim 9, wherein the bottom end has a pointed shape.

18. A fuel separating apparatus comprising:
a raw-fuel tank to store raw fuel;
a separator provided inside the raw-fuel tank to separate the raw fuel into a high-octane fuel and a low-octane fuel, the high-octane fuel containing more high-octane components than the raw fuel, the low-octane fuel containing more low-octane components than the raw fuel;
a condenser provided inside the raw-fuel tank to condense the high-octane fuel in a gaseous state separated by the separator;
a high-octane-fuel tank provided inside the raw-fuel tank to store the high-octane fuel in a liquid state condensed by the condenser;
a conduit connecting the condenser and the high-octane-fuel tank, the conduit including:
    a first conduit portion connected to the condenser and extending in a vertical direction; and
    a second conduit portion connected to the high-octane-fuel tank; and
a one-way valve provided at a position lower than the condenser in the conduit to permit only a flow of the high-octane fuel from the condenser toward the high-octane-fuel tank, the one-way valve comprising:
a housing having a substantially cylindrical shape with a center axis extending in the vertical direction and comprising:
    a peripheral side wall provided around the center axis, the peripheral side wall having an inlet connected to the first conduit portion and an outlet connected to the second conduit portion, the outlet being higher than the inlet in the height direction;
    an annular projecting portion protruding from the peripheral side wall toward the center axis; and
    a coil spring support portion protruding from the peripheral side wall toward the center axis;
a valve member inserted into the housing to be movable along the center axis such that the valve member causes the inlet to communicate with the outlet when a level of the high-octane fuel accumulated in the first conduit portion is a height threshold higher than a bottom of the outlet in the vertical direction to open the valve member, the valve member comprising:
    an outer peripheral surface provided around the center axis, the outer peripheral surface facing the annular projecting portion in a radial direction perpendicular to the center axis; and
    an outward flange provided between the annular projecting portion and the coil spring support portion along the center axis and protruding from the outer peripheral surface toward the peripheral side wall; and
a coil spring provided between the coil spring support portion and the outward flange along the center axis, the coil spring comprising:
    a first axial end having a first diameter and being in contact with the coil spring support portion and the peripheral side wall;
    a second axial end having a second diameter smaller than the first diameter, the second axial end being opposite to the first axial end along the center axis and being in contact with the outward flange and the outer peripheral surface; and
    a body portion provided between the first axial end and the second axial end along the center axis and having diameters decreasing from the first diameter to the second diameter.

19. The fuel separating apparatus according to claim 18, wherein the valve member has a cylindrical valve body to be guided by an inner edge of the inward flange, and
wherein an outer edge of the outward flange is guided by the peripheral side wall.

20. The fuel separating apparatus according to claim 18, wherein the valve member is movable between a valve closing position and a valve opening position lower than the valve closing position in the vertical direction, and
wherein the coil spring is configured to apply a spring force larger than a load of the valve member to the valve member when the valve member is at the valve closing position.

21. The fuel separating apparatus according to claim 18, wherein the valve member is movable between a valve closing position and a valve opening position upper than the valve closing position in the vertical direction, and
wherein the coil spring is configured to apply a spring force smaller than a load of the valve member to the valve member when the valve member is at the valve closing position.

22. The fuel separating apparatus according to claim 18, wherein the valve member comprises an annular seal member in contact with an inner edge of the inward flange.

23. The fuel separating apparatus according to claim 18, wherein the valve member is shaped like a shaft.

* * * * *